United States Patent [19]

Sherman

[11] Patent Number: 5,125,599
[45] Date of Patent: Jun. 30, 1992

[54] ADJUSTABLE TENSION PARACHUTE PACK AND IMPROVED CONTAINER

[76] Inventor: John B. Sherman, 1665 Lexington Ave. #106, DeLand, Fla. 32724

[21] Appl. No.: 580,448

[22] Filed: Sep. 11, 1990

[51] Int. Cl.⁵ .............................................. B64D 17/40
[52] U.S. Cl. .................................. 244/148; 244/149; 244/142
[58] Field of Search ................ 244/142, 147, 148, 149

[56] References Cited

U.S. PATENT DOCUMENTS

| | | | |
|---|---|---|---|
| 2,299,407 | 10/1942 | Quilter | 244/149 |
| 2,352,721 | 7/1944 | Krahel | 244/149 |
| 2,718,369 | 9/1955 | MacMillan | 244/149 |
| 3,690,604 | 9/1972 | Guilfoyle | 244/148 |
| 3,908,937 | 9/1975 | Poynter | 244/148 |
| 4,034,940 | 7/1977 | Bird | 244/148 |
| 4,898,346 | 2/1990 | Ertler | 244/148 |

FOREIGN PATENT DOCUMENTS 1107517 5/1961 Fed. Rep. of Germany ...... 244/147

Primary Examiner—Joseph F. Peters, Jr.
Assistant Examiner—Christopher P. Ellis
Attorney, Agent, or Firm—Rothwell, Figg, Ernst & Kurz

[57] ABSTRACT

A parachute pack of the type including a pilot chute for drawing a main parachute canopy out of its container uses a single adjustable tension retainer cord and pin which holds a compression spring for the pilot chute in an adjustably tensioned state. Various packing methods and canopy sizes may be used with the pack so that a constant tension may be placed on the compression spring regardless of the thickness of the pack. In addition, ends of side flaps of the container are attached to the bottom flap of the container, and epaulet flaps are fastened to a top flap, to form a boxlike enclosure for the main parachute so as restrict release of the main parachute from the container until after the pilot chute has attained a sufficient amount of positive drag to urge the main chute therefrom.

9 Claims, 4 Drawing Sheets

ADJUSTABLE TENSION PARACHUTE PACK AND IMPROVED CONTAINER

BACKGROUND OF THE INVENTION

1. Field of the Invention

This invention relates generally to parachute packs and more particularly to parachute packs having a compression spring-loaded pilot chute which is deployed to release and deploy a main parachute canopy from its container.

2. Background and Prior Art

Parachute packs with pilot chutes are typically used as reserve parachutes worn on the chest of the chutist as a safety precaution in the event that the main chute worn on the back fails to deploy or deploys improperly.

Parachute packs are known in the art. See, e.g., U.S. Pat. Nos. 3,262,660, 3,908,937 and 4,898,346.

Because of the backup purpose of the reserve chute, the force required to release the retainer mechanism is limited by Federal law to a maximum of 22 lbs. as a safety precaution. This force is determined by the amount of tension exerted on the compression spring by the retainer mechanism.

According to the prior art parachute pack disclosed in U.S. Pat. No. 3,908,937, the pilot chute is deployed by a compression spring which is held in a tensioned state against the pack by a pair of retaining cords which pass from opposing sides of the pilot chute and are retained against the main chute container by a pair of retaining pins which are mutually connected to a single ripcord.

The two retainer pin configuration presents an inconvenience in packing of the parachute pack as two separate retainer cords must be threaded through the pack and secured at the opposite surface thereof with two separate retainer pins, requiring the use of special tools. Additionally, because of the two-point loading of the spring, there is a possibility that the compression spring will tilt upon deployment, causing the pilot chute to be improperly projected from the pack.

Another disadvantage in the prior art is that pack thickness varies according to the size of the main canopy or the particular placement and packing technique used. Since the retainer cords are of a predetermined fixed length, the tension will vary according to the particular packing technique or canopy size utilized.

Yet another disadvantage in the prior art is the possibility that the main canopy may "float" or lift away from the wearer before the requisite positive drag force is attained by the pilot chute. This is caused by the fact that the deployment of the pilot chute will cause the flaps to open to a flat configuration allowing an air stream to pass under the main canopy. If the air stream carries the main canopy out of the container before the pilot chute attains sufficient positive drag, an out of sequence deployment will result.

An attempt has been made to improve upon the conventional parachute pack in which a single retainer cord is disposed in the center of the pack and extends through the center of the compression spring. Such is disclosed in U.S. Pat. No. 4,898,346. A convex disc is attached to the top of the pilot chute, and the retainer cord passes through an aperture in the center of the disc and is diverted to one side of the disc where it is anchored into a second aperture or grommet in the disc.

Since the retainer cord is presized to be of a fixed length before packing of the parachute pack, adjustment of the tension on the retaining cord after assembly is not possible. Because of the single cord design, the pilot chute and disc assembly may be inadvertently rotated while being worn. In such case, the retainer cord will twist up, increasing the tension on the compression spring and consequently increasing the amount of force needed to pull the retainer pin to release the pilot chute. Additionally, the method of attachment of the cord to the pilot chute disc may asymmetrically load the disc, causing the compression spring to be at an improper angle and resulting in improper deployment of the pilot chute.

In addition, the main parachute is subject to undesirable "floating" prior to attainment of sufficient positive drag by the pilot chute.

SUMMARY OF THE INVENTION

The present invention avoids the disadvantages and problems of the prior art noted above by providing a parachute pack in which the tension of the compression spring is adjustable at any time, even after packing and assembly of the pack.

The present invention further provides a parachute pack which allows the pilot chute to freely rotate on the pack without adversely affecting the amount of tension on the compression spring.

The present invention still further provides a parachute pack which prevents the main parachute or canopy from premature "floating" away from the wearer before sufficient positive drag force is attained by the pilot chute.

These advantages are realized by providing a parachute pack comprising a parachute canopy, a container for enclosing said parachute canopy having a bottom and a plurality of flaps extending around the periphery of said bottom which fold over said parachute canopy, first and second flaps of said plurality being partially attached to a third flap of said plurality to form a box-like enclosure for said parachute canopy, a pilot chute for pulling said parachute canopy from said container upon deployment of said pilot chute, a compression spring for deploying said pilot chute, a disk attached to said pilot chute having an aperture at the center thereof, adjustable tensioning means for releasably engaging said disk through said aperture and forcing said disk against said compression spring to keep said compression spring adjustably tensioned in a compressed state, said adjustable tensioning means extending through said pilot chute, said parachute canopy, and said container and being retained against an outer surface of said container bottom opposite said parachute canopy.

BRIEF DESCRIPTION OF THE DRAWINGS

The present invention will become more fully understood from the detailed description given hereinbelow and the accompanying drawings, which are presented by way of illustration only and thus are not limitative of the present invention, and wherein.

DETAILED DESCRIPTION OF THE PREFERRED EMBODIMENTS

A preferred embodiment of the present invention will now be described with reference to FIGS. 1-8.

A parachute pack 10 contains a pair of shoulder straps 11 and leg straps 12 which secure the pack to a parachutist. A ripcord 30 extends through the interior side of the parachute container and is accessed by the user through a suitable cable (not shown).

Figure 1:
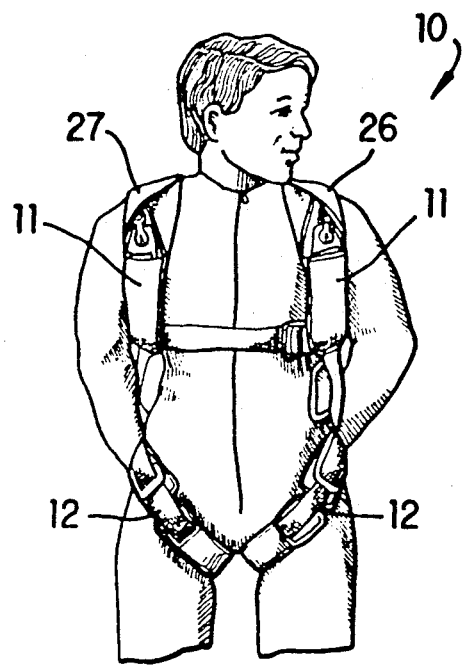
FIG. 1 is a front view of a parachute pack according to one embodiment of the present invention as worn by a user.
Figure 2:
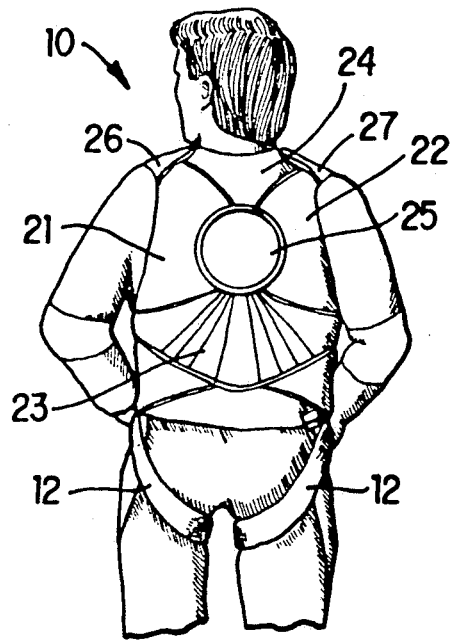
FIG. 2 is a back view of the pack of FIG. 1.
Figure 3:
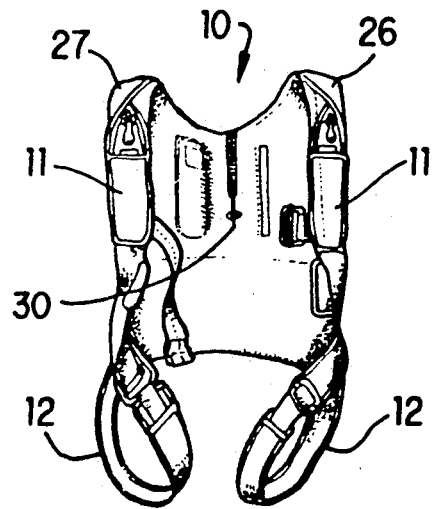
FIG. 3 is a front view of the pack of FIG. 1 removed from the user.
Figure 4:
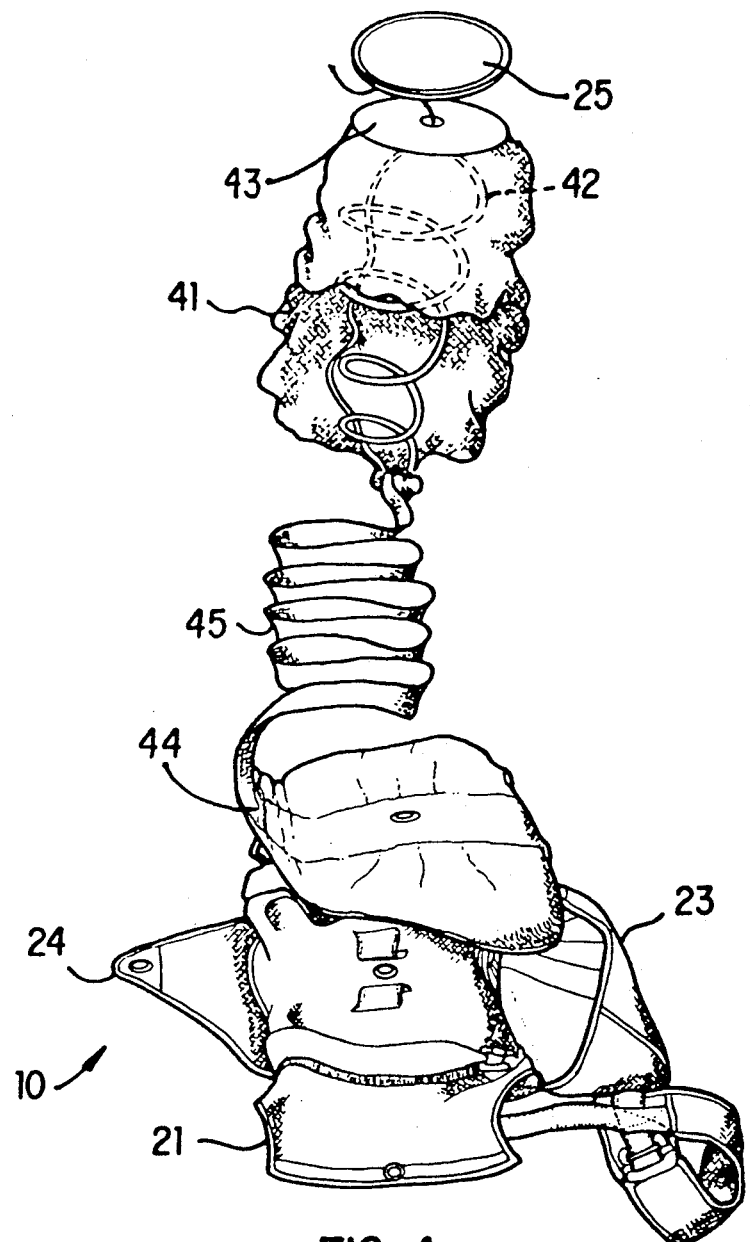
FIG. 4 is a plan view of the pack of FIG. 1 in an open condition.

Referring to FIG. 4, the pack includes a pilot chute 41 which is connected to a bag 44 having a main parachute folded therein, via a tether 45. A disc 43, preferably made of metal, is attached to the top of pilot chute 41. Compression spring 42 is attached to the top and bottom of pilot chute 41. A cover 25 wraps over the disc 43, compression spring 42 and pilot chute 41 when the pilot chute is packed, as best shown in FIG. 2.

Figure 5:
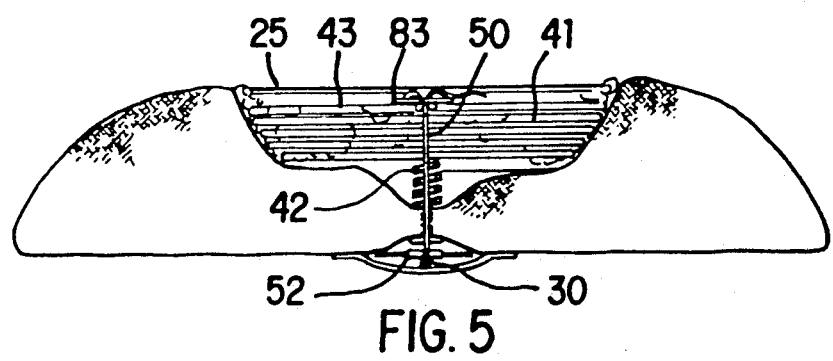
FIG. 5 is a partly cross-sectional view of the parachute pack of FIG. 1.
Figure 8:
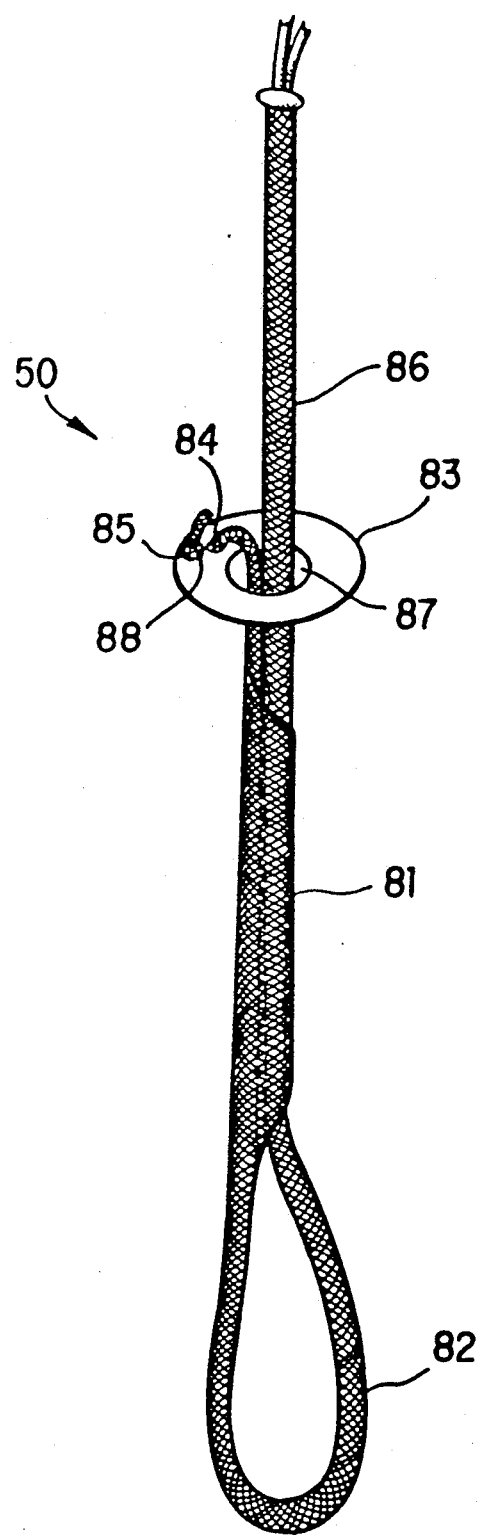
FIG. 8 is a detailed view of the adjustable tension cord 50 shown in FIG. 5.

Referring to FIGS. 5 and 8, an adjustable length looped retainer 50 includes a disc 83 having a central aperture 87 and two smaller radial apertures 84 and 85. Braided cord 86 passes through the central aperture 87, and terminates in a loop 82. One end 88 of cord 86 passes through apertures 84 and 85 and terminates in a knot to secure cord 86 to the disc 83. The cord 86 includes a channeled braided section 81 which tightens around cord 86 when opposing force is applied to the bottom end of loop 82 and to disc 83, but which allows cord 86 to be pulled therethrough in the absence of a pulling force on the bottom end of loop 82.

The adjustable retainer 50 is threaded through the disc 43, pilot chute 41, compression spring 42, bag 44, and container 10 so that loop 82 extends through a grommet in the bottom of container 10. Disc 83 contacts and forces disc 43 against compression spring 42 to keep the spring in a tensioned state, and the retainer 50 is secured in place by a retainer pin 52 inserted through the loop 82.

When the ripcord 30 is pulled by the chutist, pin 52 is removed from loop 82, thus allowing compression spring 42 to spring out of its compressed state and project pilot chute 41 into deployment.

The tension on the compression spring 42 can be adjusted at any time, including post-assembly of the pack, by adjusting the length of loop 82. The free end of cord 86 extends through the discs 43 and 83, and the loop 82 extends through the container bottom, so that tension may be increased by pulling on the free end of cord 86 and decreased by pulling on the side of loop 82 extending into channel section 81. As such, diverse packing methods and different size canopies may be utilized with the pack without adversely affecting the amount of tension on the compression spring, and consequently, the amount of force needed to release the retainer pin 52 to deploy the chute.

Further, since the disc 43 is engaged by retainer 50 through surface contact of the disc 83, disc 43 can freely rotate without adverse effect on the tension applied to the compression spring 42.

Figure 6:
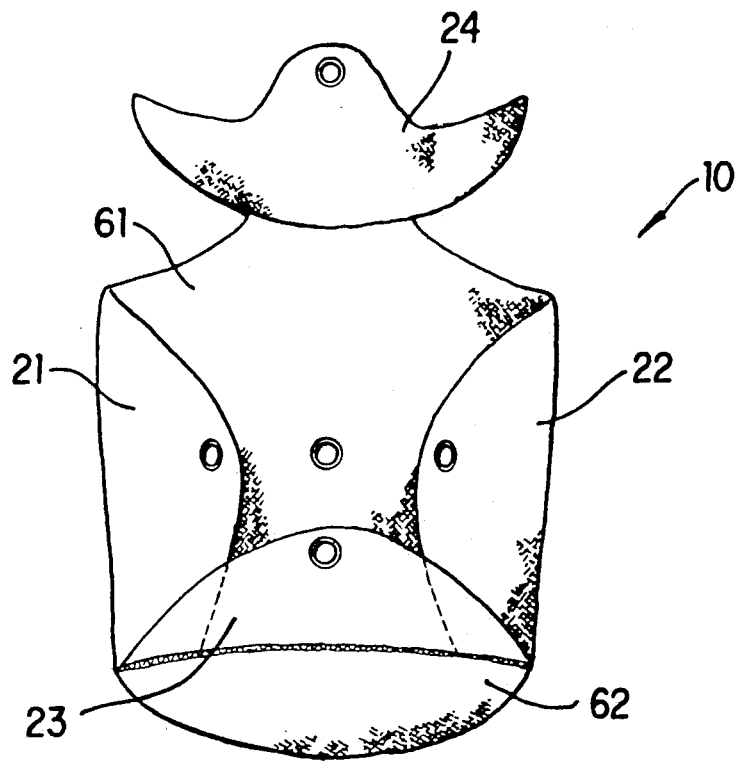
FIG. 6 is a plan view of the parachute pack container.

As shown in FIG. 6, flaps 21, 22, 23 and 24 extend from the periphery of the bottom 61 of container 10. A supplementary flap 62 is sewn across the bottom flap 23 and to the ends of side flaps 21 and 22 to form a boxlike enclosure to control release of the bag 44 after the pilot chute 41 has been deployed.

Figure 7:
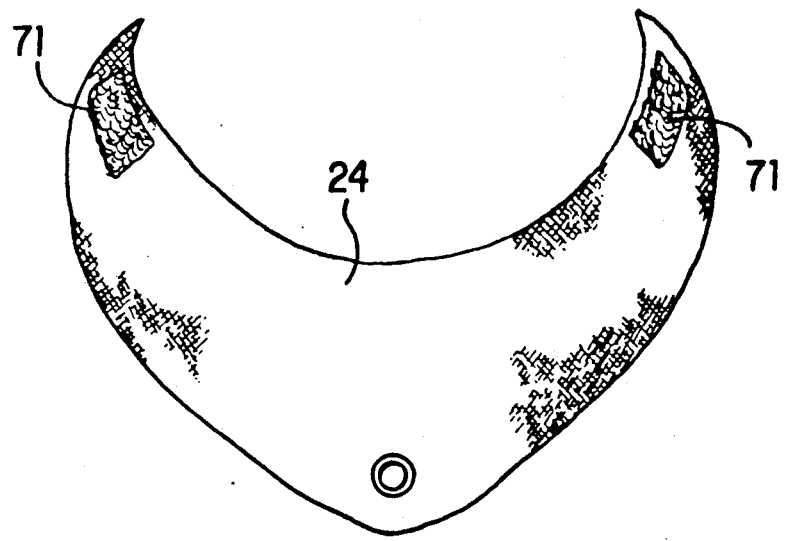
FIG. 7 is a plan view of the front of top flap 24 shown in FIG. 6.

As shown in FIG. 7, sections 71 of Velcro ® or similar fastening fabric material are attached to top or yoke flap 24. The Velcro ® sections engage with corresponding sections on epaulet flaps 26 and 27 which are provided on shoulder straps 11 as shown in FIG. 2, to provide additional bag release control at the upper corners of the container 10. The combination of the epaulet flaps and bottom flap enclosure provides just enough resistance to prevent bag 44 from being released until sufficient positive drag has been attained by the pilot chute.

The invention being thus described, it will be apparent to those skilled in the art that the same may be varied in many ways. Such variations are not to be considered as a departure from the spirit and scope of the invention. Any and all such modifications are intended to be included within the scope of the following claims.

What is claimed is:

1. A parachute pack, comprising:
    a parachute canopy;
    a container for enclosing said parachute canopy having a bottom and a plurality of flaps extending around the periphery of said bottom which fold over said parachute canopy, first and second flaps of said plurality being partially attached to a third flap of said plurality to form a boxlike enclosure for said parachute canopy;
    a pilot for pulling said parachute canopy from said container upon deployment of said pilot chute;
    a compression spring for deploying said pilot chute;
    a disk attached to said pilot chute having an aperture at the center thereof;
    adjustable tensioning means for releasably engaging said disk through said aperture and forcing said disk against said compression spring to keep said compression spring adjustably tensioned in a compressed state such that the amount of compression of said compression spring may be varied by adjustment of said adjustable tensioning means;
    said adjustable tensioning means extending through said pilot chute, said parachute canopy, and said container and being retained against an outer surface of said container bottom opposite said parachute canopy.

2. A parachute pack according to claim 1, having a fourth flap extending from the bottom of said container opposite said third flap; and
    first and second epaulet flaps attached to first and second shoulder straps of said pack frictionally attachable to said fourth flap.

3. A parachute pack according to claim 2, wherein said epaulet flaps are attached to said fourth flap by Velcro.

4. A parachute pack according to claim 1, wherein said adjustable tensioning means comprises a disk having an adjustable length loop cord attached thereto and engaging said pilot chute disk by surface contact, said adjustable length loop cord being retained against said outer container surface by a retainer pin.

5. A parachute pack, comprising:
    a parachute canopy;
    a container for enclosing said parachute canopy having a bottom and a plurality of flaps extending around the periphery of said bottom which fold over said parachute canopy, first and second flaps of said plurality being partially attached to a third flap of said plurality to form a boxlike enclosure for said parachute canopy;

a pilot chute for pulling said parachute canopy from said container upon deployment of said pilot chute;

a compression spring for deploying said pilot chute;

tensioning means for maintaining said compression spring tensioned in a compressed state against said container; and means for releasing tension from said compression spring to effect deployment of said pilot chute;

said tensioning means being adjustable to keep said compression spring adjustably compressed such that the amount of compressive force may be varied by adjustment of said tensioning means;

said tensioning means extending through said parachute pack and being retained against an outer surface of said container bottom.

6. A parachute pack according to claim 5, having a fourth flap extending from the bottom of said container opposite said third flap; and first and second epaulet flaps attached to first and second shoulder straps of said pack frictionally attachable to said fourth flap.

7. A parachute pack according to claim 6, wherein said epaulet flaps are attached to said fourth flap by Velcro.

8. A parachute pack, comprising:

a parachute canopy;

a container for enclosing said parachute canopy having a bottom and a plurality of flaps extending around the periphery of said bottom which fold over said parachute canopy;

a pilot chute for pulling said parachute canopy from said container upon deployment of said pilot chute;

a compression spring for deploying said pilot chute;

a disk attached to said pilot chute having an aperture at the center thereof; and adjustable tensioning for releasably engaging said disk through said aperture and forcing said disk against said compression spring to keep said compression spring adjustably tensioned in a compressed state such that the amount of compression of said compression spring may be varied by adjustment of said adjustable tensioning means;

said adjustable tensioning means extending through said pilot chute, said parachute canopy, and said container and being retained against an outer surface of said container bottom opposite said parachute canopy.

9. A parachute pack according to claim 8, wherein said adjustable tensioning means comprises a disk having an adjustable length loop cord attached thereto and engaging said pilot chute disk by surface contact, said adjustable length loop cord being retained against said outer container surface by a retainer pin.

* * * * *